US008898148B1

(12) United States Patent
Yagnik et al.

(10) Patent No.: US 8,898,148 B1
(45) Date of Patent: Nov. 25, 2014

(54) TARGETING TO PHYSICAL ENVIRONMENT

(75) Inventors: Jay Yagnik, Mountain View, CA (US); Niyati Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 59 days.

(21) Appl. No.: 13/443,079

(22) Filed: Apr. 10, 2012

Related U.S. Application Data

(63) Continuation of application No. 12/350,318, filed on Jan. 8, 2009, now abandoned.

(51) Int. Cl.
*G06F 17/30* (2006.01)
(52) U.S. Cl.
USPC .......................................................... 707/721
(58) Field of Classification Search
CPC ................................................ G06F 17/30864
USPC .......................................................... 707/721
See application file for complete search history.

(56) References Cited

U.S. PATENT DOCUMENTS

2004/0249801 A1* 12/2004 Kapur ................................ 707/3

* cited by examiner

*Primary Examiner* — Huawen Peng
(74) *Attorney, Agent, or Firm* — Bracewell & Giuliani LLP

(57) ABSTRACT

A computer-implemented information targeting method is disclosed. The method includes receiving a search query from a computing device, where the search query has at least two different meanings, identifying metadata associated with the search query, using the metadata to promote search results corresponding to a first meaning of the at least two meanings of the search query, and providing search results corresponding to the first meaning of the search query to the computing device. Using the metadata to promote search results may comprise analyzing (a) prior search queries that are related to the received search query, (b) metadata associated with the prior search queries, and (c) selections of search results provided in response to the prior search queries; and identifying a correlation between the metadata associated with the prior search queries and selections of search results presented in response to the prior search queries.

12 Claims, 8 Drawing Sheets

TARGETING TO PHYSICAL ENVIRONMENT

CROSS-REFERENCE TO RELATED APPLICATION

This application claims priority to U.S. Provisional application Ser. No. 12/350,318, filed on Jan. 8, 2009, entitled "Targeting to Physical Environment," the entire contents of which are hereby incorporated by reference.

TECHNICAL FIELD

This document relates to targeting on line content to users of computing devices based on factors in the users' physical environments.

BACKGROUND

Internet-based services are very popular and continue to multiply in number and improve in quality. For example, on-line e-mail systems can be accessed from all over the world (not simply from a LAN inside a particular organization) and can store a lifetime of e-mail correspondence. Internet search engines provide incredibly accurate responses to search queries, and can lead a user on a journey through information that is relevant and interesting to the user.

On-line services may benefit by acting in manners that are specific to particular users. For example, an e-mail application may learn a user's behavior and may filter e-mails to match that behavior. In a similar manner, search results may be targeted to explicit or inferred attributes of a user. As one example, a user may indicate that they are within a particular demographic group, and search results that are known to be relevant to that demographic group may be elevated over other search results for the user. Similarly, advertisements may be targeted to known preferences of a user, so that the user may be presented with advertisements that are more interesting and relevant to the user. In such a manner, a user may be provided with improved services and their on-line experience may improve as a result, and advertisers benefit by having better user reactions to their advertisements.

Such targeting may be difficult when delivering search results because of the issue of polysemy. In particular, a single word or group of words may have different meanings in different contexts, and it may be difficult for a system to determine the meaning that is (silently) intended by a user submitting a query. For example, the term "mole" may be used to refer to an animal or a sneaky person. And a user can enter the same search query, intend the terms in the query to have the same meaning, but have a secret intent of what they want to receive from the query. For example, a user in the winter who queries on the term "golf" may be looking for vacation destinations, while a user who queries on "golf" during the summer may be looking for local golf courses.

SUMMARY

This document describes systems and techniques that may be used to provide information that is targeted to a user searching for information. The information may include, for example, search results and targeted advertising. The targeting may be based, at least in part, on the physical environment of the user at or around the time of a request for information. For example, if a user searches for "water park" in the winter, they are likely interested in a much different experience than if they search on a hot, sunny day. Likewise, if a user searches for "restaurant" in the morning, they are likely to be interested in something different than if they submit the same search late at night. Thus, the physical, real-world environment around the user can be relevant to a user's needs, and thus to the targeting of information to the user.

Using the techniques discussed here, a system may analyze searches and responses from a large plurality of users to first identify one or more conditions of the physical environment around those users when they performed searches, and then may identify correlations between the physical environment and the user's actions. For example, a system may find a strong correlation between cold weather and users' selection of a particular search result (or a combination of the search result and an associated search query).

In certain embodiments, the features discussed here may provide one or more advantages. For example, users of a search system may receive search results, including promotional ads, in a manner that is better targeted to their desired results. Such users are more likely to be happy with the results and return to the same search system, and are also more likely to respond positively to the ads, such as by clicking on them. Advertisers may thus benefit by pushing more users toward their web sites or other content, and a company managing the advertising and search results may benefit by providing improved user responses to ads for which advertisers pay the company.

In one implementation, a computer-implemented information targeting method is disclosed. The method comprises identifying with a computer a plurality of past search queries from electronic communication devices, using (a) electronic log data for the plurality of past search queries and (b) physical environment data for an area around locations at which the search queries were initiated, to identify one or more correlations between information associated with certain of the plurality of search queries and the physical environment data, and producing one or more transformations based on the one or more identified correlations to affect a presentation of one or more search results that are responsive to a query corresponding to one of the plurality of past search queries. The transformations can comprise rules for rewriting the query, and the method can further comprise receiving a real-time search query, rewriting the real-time query using the transformation, submitting the rewritten query to a search engine, and providing search results from the rewritten query in response to the received real-time search query. Also, the rewritten query can comprise a logical expansion of the received real-time query.

In certain aspects, the search results comprise web search results and advertisements targeted to the real-time search query using physical environment data associated with the real-time query. In addition, the method may include receiving a real-time search query, identifying current physical environment data for an area in which the real-time search query was submitted, applying a transformation generated from log data associated with physical environment data that matches the current physical environment data, and transmitting search results generated using the transformation. Also, applying the transformation comprises can comprise elevating candidate search results that received positive user reactions for stored past search queries associated with physical environment data that matches the current physical environment data.

In certain aspects, the physical environment data comprises weather data, and the method can also include obtaining the weather data by correlating stored weather data with an IP address and time associated with a query. Moreover, producing one or more transformations can comprise producing a mapping from an initial query to a rewritten query by identifying a plurality of candidate rewritten queries and selecting, as the rewritten query, a candidate rewritten query having a highest number of user interactions from among the plurality of candidate rewritten queries.

In other aspects, producing one or more transformations to affect a rank of one or more search results comprises increasing the rank of the one or more search results. Also, information associated with certain of the plurality of search queries can comprise click data on search results by users who presented the plurality of search queries.

In another implementation, a computer-implemented information targeting system is disclosed. The system comprises a query log containing information about prior queries submitted by users to a public search engine. The system also comprises a lookup module to use the information about prior queries to identify physical environment status for areas in which the queries were made, and a correlation module programmed to identify correlations in user reactions to search results for queries having similar physical environment statuses and to generate a model for affecting future queries based on information about physical environments surrounding the future queries.

In some aspects, the system can also include a search engine programmed to apply the model so as to generate search results that reflect the identified correlations in user reactions. In addition, the system can have an advertising server to provide advertisements in response to keywords generated by the model, so as to provide advertisements targeted at least in part to a physical environment of a searcher. The correlation module can be programmed to identify predetermined query clusters and to substitute, for a first member of the predetermined query cluster received as a user query, a second member of the query cluster. Also, the system can have a table of physical environment data computed using location and time data for searches in the query log. Moreover, the lookup module can be programmed to access third party data sources over the internet using a published application programming interface.

In yet another implementation, a computer-implemented information targeting system is disclosed. The system includes a query log containing a large plurality of information about prior queries submitted to a search engine, and a lookup module to use the information about prior queries to identify physical environment status for areas in which the queries were made. The system also includes means for generating search results for a received query by using physical environment data associated with an area from which the query is received. The means can, in some aspects, comprise a means for analyzing historical search data to identify correlations between physical environment data in the area of a search and user reaction to the search, and a search engine programmed to apply a ranking signal generated by the means for analyzing historical search data.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for targeting search results and similar electronic content. In general, the techniques target the results so as to provide results to which prior users in similar physical environments had appositive reactions. For example, if a number of users in various areas having steamy weather all click on a particular search result, but users where the weather is cold do not, then the techniques may determine that there is a positive correlation between hot weather and the particular result. If another user provides a query that generates the same result, a ranking for the result may be increased because of the determined correlation between hot weather and user preference for that result. Other parameters of a physical environment may also be tested against prior search activity, such as by analysis of large search logs.

Figure 1A:
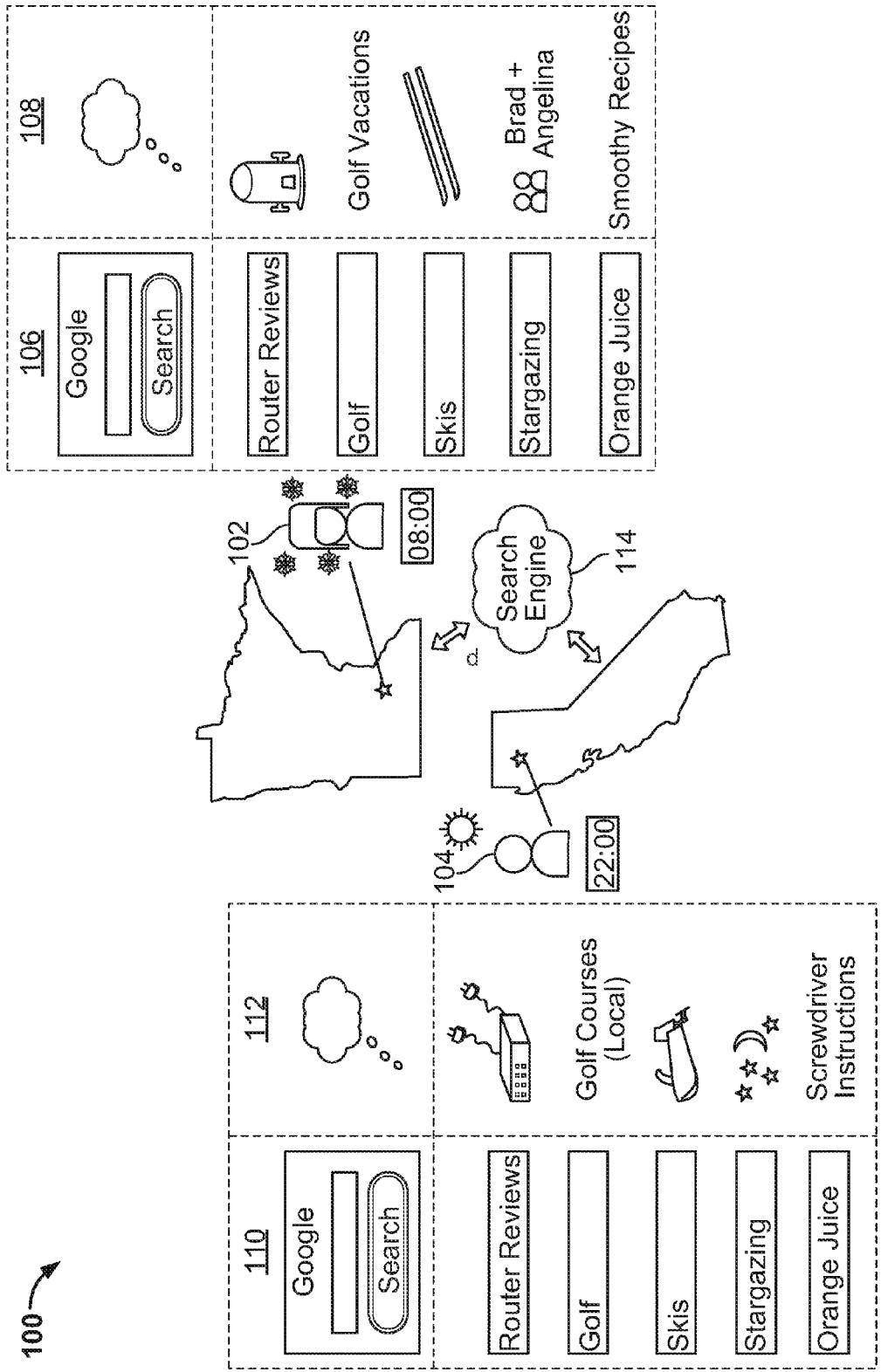
FIG. 1A is a conceptual diagram showing user search preferences that may depend on characteristics of a user's physical environment.

FIG. 1A is a conceptual diagram showing user search preferences that may depend on characteristics of a user's physical environment. The diagram shows a highly stylized system 100 of two different computer users—California Cal 104 and Minnesota Mike 102—along with matched search queries each has entered, and the true intent that each user had in entering each query.

Minnesota Mike is searching on a cold day in Minnesota, as indicated by his hat and the snowflakes around him. Such a parameter of Mike's physical environment may be determined, such as by a search engine 114 tasked with providing search results in response to submitted queries, in a number of manners. For example, Mike's query may be accompanied with such information, such as if Mike has a mobile computing device that includes a thermometer. The information may also be derived from location-related information, such as by GPS-derived data submitted by a device, by determining a cell in a cellular network through which Mike is transmitting (e.g., the GOOGLE MY LOCATION service), or by associating a geographic location with an IP address provided by the device. Multiple such clues may also be used and may be resolved to make a best location determination from the available data. Such location information may then be submitted to a weather server to identify relevant weather conditions in the area. In addition, where precise weather data is not needed, general climate data may be used, such as by noting that Mike is broadcasting from Minnesota and the calendar returns a value of January. In similar manners, the system 100 may determine that the weather is sunny and about 70 degrees Fahrenheit around Cal 104.

Other relevant information from the physical environment may also be captured, such as the time a user's query is submitted (here, the time is 08:00 for Mike and 22:00, or 10 p.m., for Cal). The time of a search may also inform what the searcher truly hopes to find. Likewise, the location itself may indicate what the person intends by a query, since people who live in proximity to each other are more likely to share a common intent on many topics than are people from far-flung areas.

Columns 110 and 106, for each of Cal and Mike, respectively, show terms entered as queries to a search engine. For clarity in comparison, each column includes the same five queries. Columns 112 and 108 show what each user actually intended by submitting each query. For example, the first query is "router reviews," where each user would like to see reviews for products from other users. However, Mike, as a Midwesterner and therefore a woodworking hobbyist, is actually interested in mechanical routers—devices with rotating bits designed to cut through wood edges. In contrast, Cal is in the heart of Silicon Valley, and is interested in network routers—devices that route bits through a network. By understanding each user's physical environment, the search engine 114 can better deliver results that are meaningful to each user, even though both users submitted the same query.

The next two queries have a correlation to the current weather. In particular, when entering the term "golf," a user in a cold location may be looking for golfing vacation spots where they can escape the cold weather (and definitely not for golfing in the local area), while a user in a warm location (such as Minnesota in the summer) may be more interesting in seeing a list of local golf clubs. In a similar manner, the query "skis" may represent a boat and water skis to someone around warm weather, and downhill snow skis to someone in cold weather.

The last two queries are intended to show different intents for users when they search at different times of the day. In particular, someone searching on "stargazing" at night is likely to be interested in information about the celestial stars, such as sky maps and the like. In contrast, someone conducting the same search in the early morning may be more interested in finding out where their favorite Hollywood stars had been spotted the night before. In a similar manner, a user searching on "orange juice" may be interested in using it to make a screwdriver late at night but may be interested in blending it with other fruit into a smoothie in the morning.

Other parameters of a physical environment around a user may also be used in appropriate circumstances. For example, the topics of news stories for an area around the user may be analyzed, and reactions of users to prior searches may be used to affect the search results for later users who are in areas having similar news.

Figure 1B:
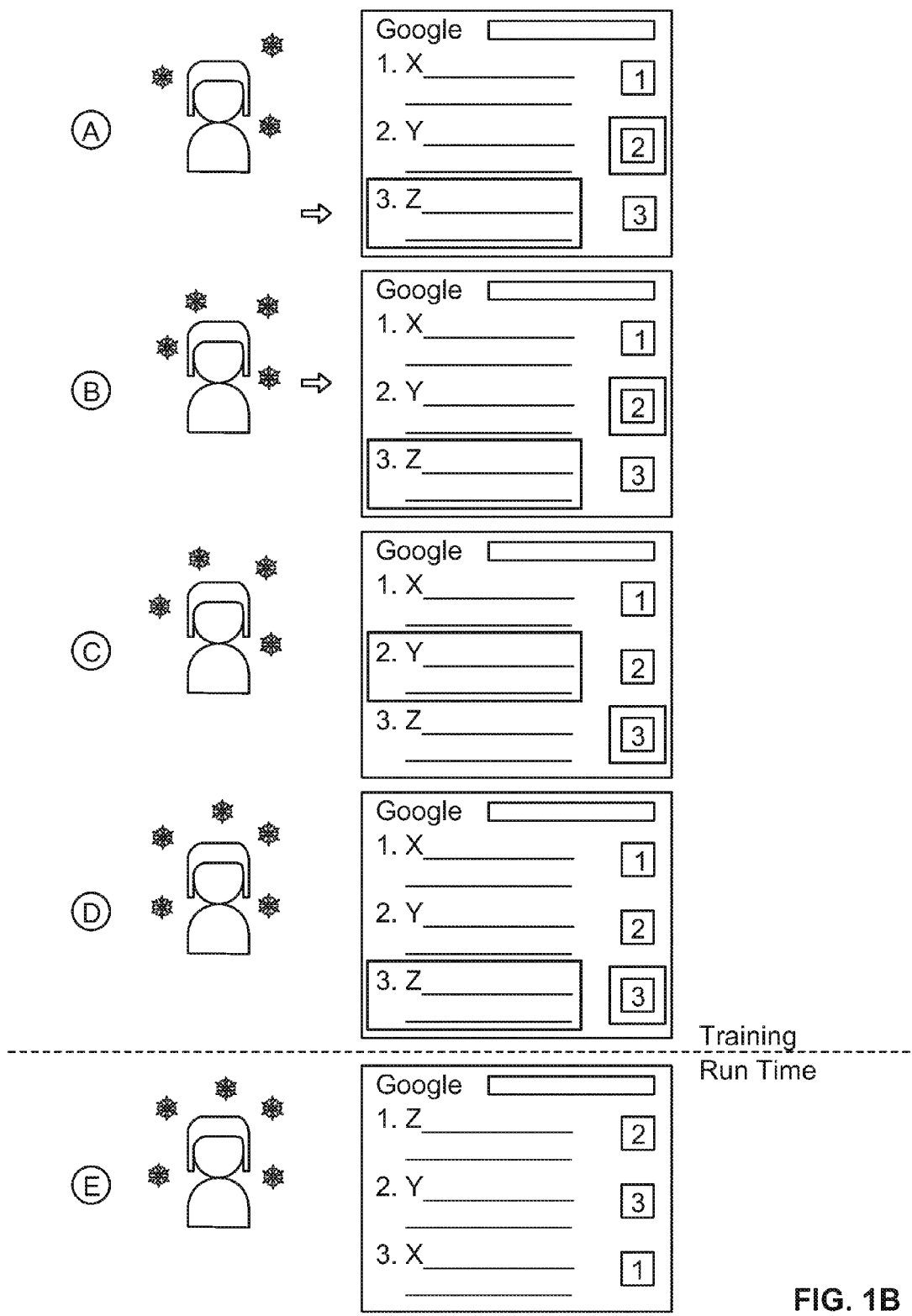
FIG. 1B is a conceptual diagram showing the correlation of search results to a physical environment.

FIG. 1B is a conceptual diagram showing the correlation of search results to a physical environment. In general, the figure shows various scenarios of users conducting and reacting to online searches. In this conceptual representation, five different users who are employing a search engine are labeled from A to E, and are shown in a snowy, and thus cold, physical environment. Next to each user is shown a search results screen that includes ranked search results on the left-hand side and ads on the right-hand side, similar to their display in GOOGLE search results.

A first group of searchers and searches (at the top of the figure) is labeled as a "training" group, and involves searches that are analyzed by a system to improve responses that are provided to later searchers. A second group, involving a single search user E, is referred to as a "runtime" group. That group relates to the use of information gleaned from the prior users in the training period to improve search results, including ranked search results and ads, that are presented as actual search results for a later user.

In this example, we assume that each of the users entered the same or a synonymous search term. Superimposed over each search result display are thick rectangular lines indicating the results that the particular user selected. For example, user A selected ranked search result number 3 and also selected advertisement number 2.

A selection may be determined in a number of ways. As one example, a result may be deemed to have been selected if the user clicks on the result and stays at that result for a sufficient period of time. Such a lingering at the result tends to indicate that the result was a quality result, and that the user appreciated the result and stayed there to review it in substance. In a converse manner, a result may be determined to be a negative result if a user clicks on the result and then immediately returns to the search result page. Such activity may indicate that the snippet of the search result on the search result page looked relevant to the user, but that the search result was not relevant once the user was taken there and saw what the result really represented. In the techniques described here, long clicks, where a user stays at a result for a long time, may be treated favorably and have a positive impact on the ranking of a particular result, whereas short clicks they be disfavored and have a negative effect on the ranking of such results.

As further shown in the figure, User B received the same results and reacted in the same manner as did user A, by selecting search result 3 and ad 2. User C reacted very differently, by selecting ranked result 2 and ad 3, and user D reacted as a hybrid of the earlier users, by selecting ranked result 3 and ad 3.

What one can generally see through these reactions is that users in cold weather generally do not approve of ranked result number 1 and ad 1, when they are provided in response to the relevant query here. There is, in contrast, a fairly strong preference for ranked result 3 and an evenly split preference for ads 2 and 3. A more complete indication of user preferences may be obtained by also looking at responses by users in warmer weather or who otherwise do not match a physical characteristic relating to these other users. For example, if users entering the same search term during the summer or when it is otherwise warm outside select ad 1 or ranked result 1, a system may be more confident in finding a correlation between cold weather and the selections of the lower search results and ads. In this manner, a model may be developed that indicates a more positive correlation for the particular search or similar searches, and the selection of the lower search results and advertisements in this group.

User E is a user who will now enjoy the benefit of the analysis undertaken from the reactions of users A through D. In particular, user E is searching from an area where the weather is cold, as determined by the system, for example, by identifying an IP address for the user, identifying a geographic location for the IP address, and identifying the current temperature for the geographic location. Alternatively, a temperature for the user may be inferred by identifying a general location at a time of year (using a time associated with the user's query), so that a Minnesota user will be assumed to be in cold weather in January, for example.

In the situation shown in the figure, a model that has been developed from the actions of users A through D understands that prior users in cold environmental conditions have preferred ranked result 3 to a large degree, and also ads 2 and 3 equally for each other. As a result, the top-ranked search result for user E is indicated by the letter Z, which is now number 1 but was previously number 3 for the earlier users. In a like manner, the order of the advertisements has changed in response to user reactions to such advertisements.

Similar changes in the order of the search results may not have been made if user E had been determined to be from a warm weather area, and thus may not have shared the preference is of users a A-D. In addition, different physical environment factors associated with users in a search may be analyzed using various statistical mechanisms, to determine which factors have an effect on the user at a particular point in time and for a particular search. For example, such statistical analysis may show that the weather in a user's area has a strong correlation for searches concerning outdoor sports or restaurant selections, whereas the time of a search may have a much larger correlation to search queries for special events in which a user may be interested. Using techniques described in more detail below, such various correlations may be determined for a variety of physical environment factors and may be used in ways similar to those just described, to affect search results or other information provided to a user.

Figure 1C:
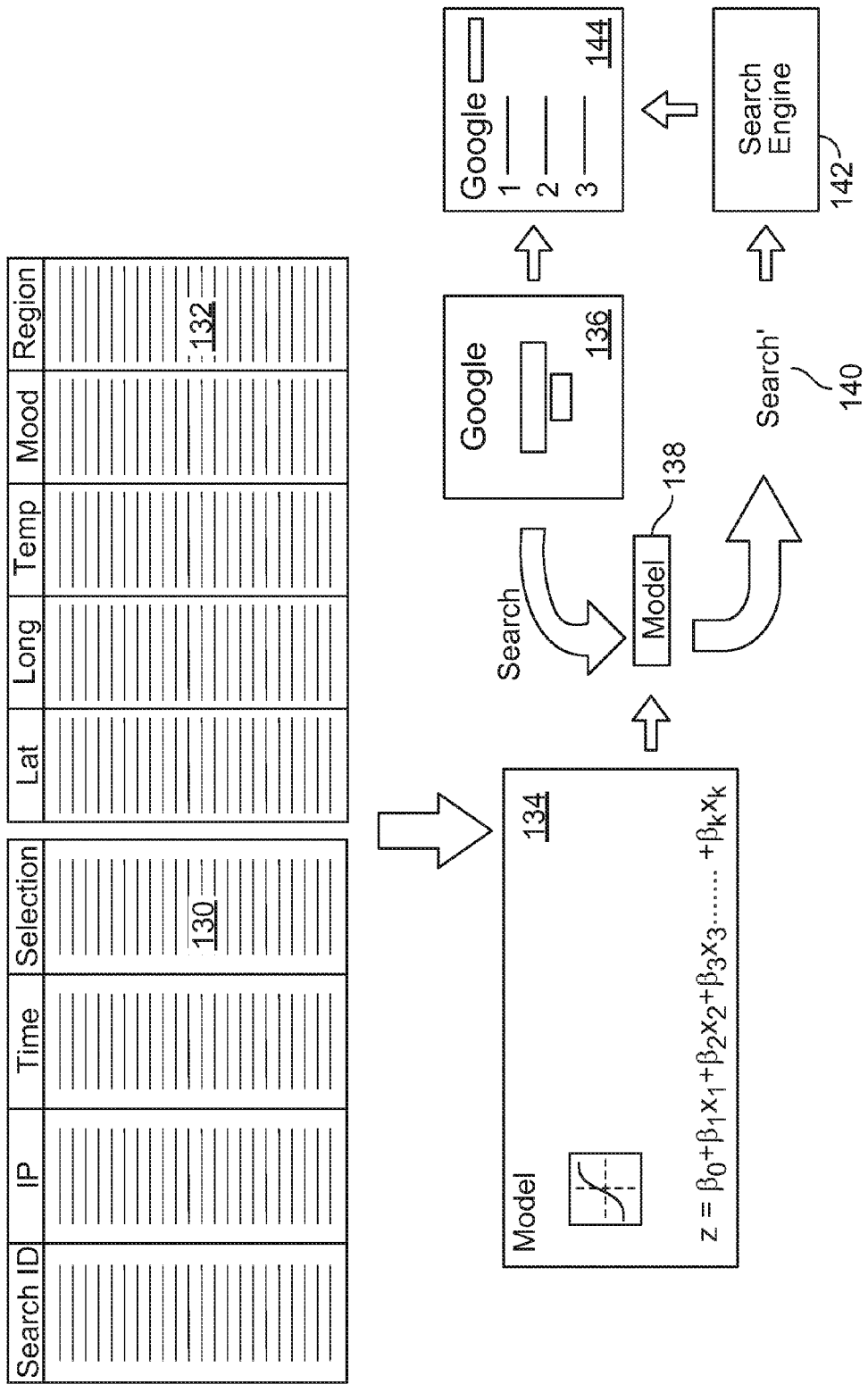
FIG. 1C is a conceptual flow diagram showing the use of physical environment and past user behavior to affect search results.

FIG. 1C is a conceptual flow diagram showing the use of physical environment and past user behavior to affect search results. In the diagram, a search log 130 is analyzed to produce an analytical model 134 relating to environment factors for searches represented by the log, and that model 134, in its original or a revised form 138, is then applied to future searches submitted by other users.

At the top of the figure, a search log 130 is shown, and includes several exemplary fields. For example, a search ID field may represent a unique index number for each search query that is received by a system, so that the searches may be accessed independently of each other at a later time. An IP address field represents an IP address for the user submitting the search, while a Time field represents the time that the search occurred, such as a UTC indicator. Finally, a Selection field represents a URL or URL's that a user has selected in response to a search result. The Selection field may include, for example, one or more URL's representing long clicks that were made by the relevant user. In addition, a string may be stored (not shown) in the log 130 to indicate the search query that was received by a user. Moreover identification numbers may be stored that indicate which ads were shown to the user, and also on which ads the user clicked or long clicked.

An extended log 132 shows additional fields that may be computed from the data in the search log 130 and external data (i.e., data that is external to the search system itself) in attempting to analyze physical environment factors relating to users represented in log 130. For example, a latitude and longitude may be computed for each user, such as by using GPS data directly, or by determining an approximate location for the IP address in search log 130. Also, a temperature field may be included, and the temperatures may be calculated by identifying the time of each search and the latitude and longitude of the search, and providing such information to a weather server. The temperature may also be approximate, and may be based, for example, on a typical temperature in a general area of the search around the same time the search was made. For ease of later processing, the temperature can be classified into one of a small number of groups, such as into deciles of temperatures.

In certain implementations, a mood factor may also be computed, where the mood factor represents a general public level of morale in the area of the searcher at the time of a particular search. For example, the public morale may extend from malaise to outright excitement, and each such level of mood may be associated with a number that is stored in the extended log 132. Information used to compute the mood may include local news for an area, such as to indicate whether natural disasters have occurred so as to lower the public mood. In addition, information such as weather, time of day, stock market movements, economic indicators for a region, and other such information may provide an indication of a public mood. Moreover, terms entered by users in a region to a search engine may reflect a mood in an area, such as an increase in queries like "counseling services" may indicate a negative or unhappy mood. Tracking mood data may be important as explained below for providing improved results and advertisements to a user.

A region field may also be used to identify an area from which each search originated. The region, for example, could be broken out by country, by continent, by language group, or by other customary method for identifying one region from another. For certain types of terms, there may be a strong correlation in the desired results among members of a single region, where that correlation is not present across regional boundaries. Thus, positive or negative reactions by certain users in a region can be used to affect results that are displayed to later users from the same region.

The logs may also take a revised form in certain implementations. As one example, additional log tables may be formed to identify candidate query expansions that may be used to generate broader queries that are more likely to generate accurate search results for a user of a system. For example, a table may be formed as a mapping of each submitted query from users to various features for that query (e.g., time or date, location, temperature, mood, etc.) for each instance of the query. As explained in more detail with respect to FIG. 3C, a subsequent table may then be formed that lists counts for particular values of one of the features, along with the query for each search and a first URL or set of URL's selected by the user. The top queries that lead to each URL selection may then be determined, and potentially similar query pairs may be determined.

As part of this process, a model 134 for the data set may begin to be formed. As further steps in refining the model, a query norm may be determined, which normalizes a vector associated with the query to a unit length, and a correlation for each query pair, such as in the form of a cosign similarity, may be determined. From this, top similar queries may be determined for each feature value for each query. For example, the queries "drink" and "chai" may be determined to be similar for a temperature feature value of "cold," whereas queries "drink" and "lemon juice" may be determined to be similar for a temperature feature value of "very warm." Such a group of similar queries may be termed a query cluster. Each query cluster may then be tested to determine if the expanded query shows significantly different results (e.g., ranked results or ads) than the narrower original query. The cluster may also be tested to determine that the expansion is sufficiently different for different feature values (i.e., to indicate that there is truly a correlation between the feature value and the targeting of the results). The resulting clusters may be mapped from queries that led to the clusters in the foregoing analysis—thus, when real-time requests arrive, they can be remapped to query clusters and be expanded quickly before being submitted to a search engine.

The final model 138, which may be the same as model 134, is then ready for real-time application. In the example shown here, a user provides a query to a search display 136. The query is then submitted to a search engine system, optionally with additional data such as a location identifier for the user's computing device (e.g., from a GPS reading, from a location stored on the device, from cell ID determination, or from IP address determination). The search engine system supplies the query to the model 138, optionally after parsing physical environment data from the query or generating such data. In some examples, an expanded query 140 (termed search prime here) that can then be submitted to a search engine 142 is used. In other embodiments, the original query is provided to the search engine 142 along with data that reflects the physical environment data. The search engine then generates a list of results, which can include standard ranked results (e.g., unpaid web or image search results) and paid results (e.g., text, image, or other forms of ads). The results may be generated based on content of target pages for the results (e.g., for web search) or by keywords associated with the results (e.g., for ads, where the advertisers select the keywords).

In this manner, past correlations may be determined between physical environment data surrounding prior searches and user reactions to search results for such searches. Such correlations may then be used to affect search results that are provided to future searches. For example, correlations between reactions to various queries under comparable physical environments may be used to create expanded queries. Also, reactions to particular search results by past users may be used to elevate or demote such results for users submitting later queries. Other mechanisms and details for using such correlations are described more fully below.

Figure 2:
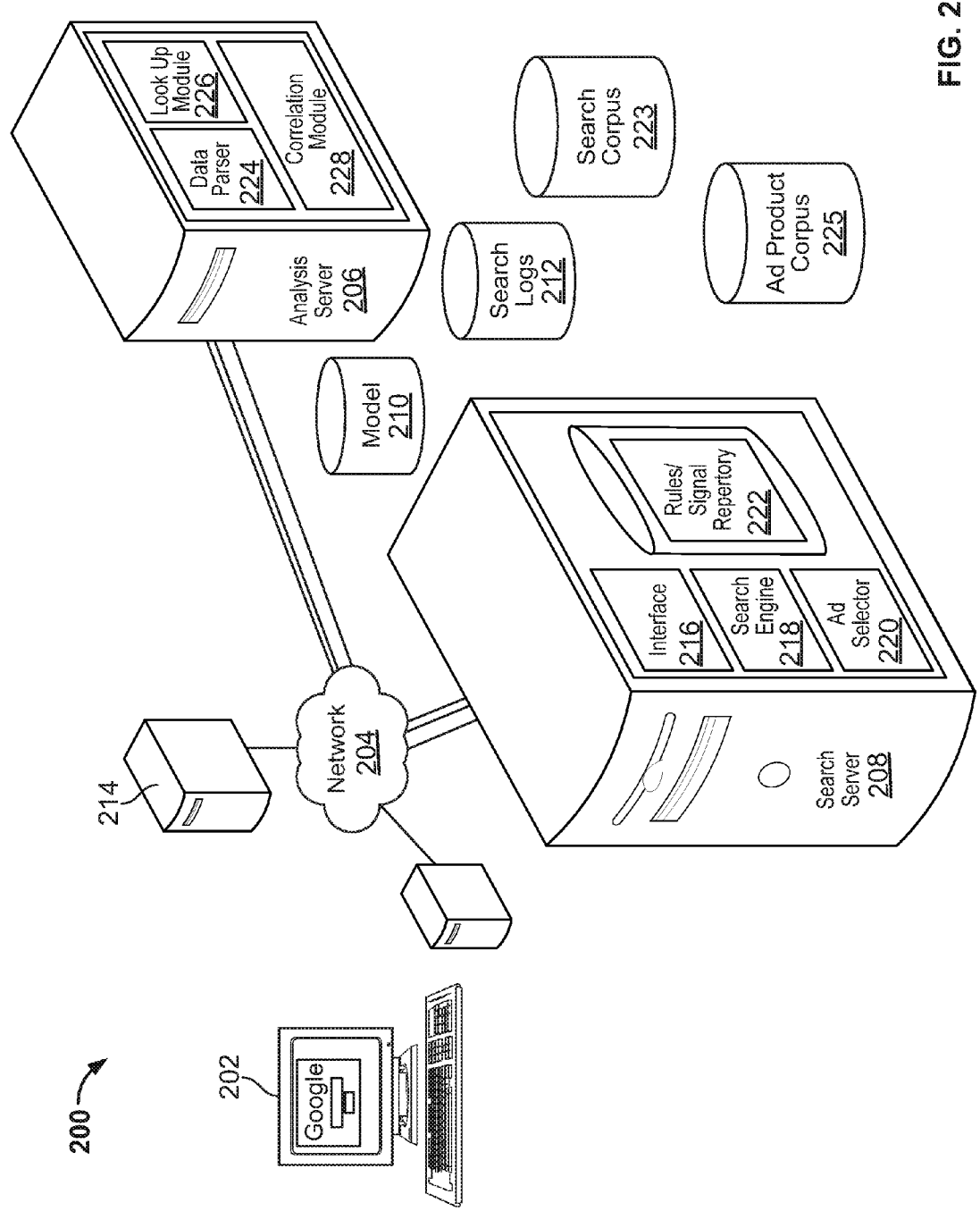
FIG. 2 is a block diagram of a system for providing search results based on physical environment parameters.

FIG. 2 is a block diagram of a system 200 for providing search results based on physical environment parameters. In general, the example system 200 includes a client device 202 on which a search query may be submitted and search results returned, communicating over a network 204, such as the internet. Such search results may be affected by earlier search queries, search results, and user responses to search results by the same user or other users who were subject to the same or to different physical environment factors as compared to the current user.

Search results are provided in this example using a combination of an analysis server 206 and a search server 208. The analysis server 206 is generally tasked with analyzing data concerning searches that occurred in the past, to identify correlations between and among such searches so as to generate one or more models that may be applied to searches that occur in the future or in real time. The search server 208 receives search queries and applies various rules or other signals to the queries in generating and ranking search results. The search results may include, for example, un-paid, ranked search results and paid advertisements. Such results may be affected, in this example, by information that the system 200 can gather regarding the physical environment around searchers in the past and around searchers who submit their searches in the future.

Referring now to the analysis server 206, the server 206 includes a data parser 224 which may be employed to break apart elements within a search query, search results, or other data supplied to the analysis server 206. For example, the data parser 224 may separate a search query from an IP address for a search. Other similar manipulations of incoming data may also be performed by the data parser 224.

The analysis server 206 may operate on stored data such as data in search logs 212, and may also be supplemented with real-time data as additional searches are performed in the system 200. For example, the analysis server 206 may initially develop a model 210 that reflects usage by users of the system 200, and may update values in the model 210 as additional users use the system, so that the model 210 stays current.

A correlation module 228 in the analysis server 206 is programmed to identify various correlations between and among queries, and responses and results for queries in the system 200. One such example of correlations to be determined by the correlation module 228 includes correlations relating to factors relating to the physical environment around searchers, such as around client device 202. Such factors may be computed by the correlation module 228 or another component of analysis server 206. For example, the search logs 212 may include an IP address, and the correlation module 228 may compute a location or region associated with that IP address.

The correlation module 228 may also determine physical environment information from other sources, such as by using lookup module 226. Lookup module 226 may be provided with an interface such as an interface matching an application programming interface (API) that is public and available to various services, so as to access physical environment data from third-parties or from elsewhere in system 200. For example, server 214 may represent a server system of a third-party that maintains weather data across a large area such as across the entire continental United States. Server 214 may be operated by an organization that has published an API for obtaining temperature data for a particular area at a particular time. For example, an HTTP request may be made of server 214 and formatted with a latitude and longitude, and date/time indicator. The server 214 may, in response, return a temperature formatted in degrees Celsius or degrees Fahrenheit. That temperature may correspond to a measured temperature for the particular area at the particular time. The lookup module 226 may receive such information in response to requests made to third-parties such as to server 214, and may format the information in appropriate manners for use by correlation module 228. For example, the lookup module 226 may format a temperature received from server 214 into one of a number of temperature ranges, such as a decile range, or according to a score of 1 to 5, where the range represents a very cold temperature up to a very warm temperature.

With the relevant information collected concerning prior searches, including physical environment data associated with those searches, the correlation module 228 may operate according to an appropriate analysis mechanism to determine correlations between various queries and responses to queries, and also to values of various variables such as values in a physical environment around searchers, so as to generate model 210. Detailed descriptions of particular approaches to generating such models are provided above, and below in FIGS. 3A to 3C.

Search server 208 may operate in run-time and may be one or more servers that are operated by a common organization with analysis server 206, which may itself be one or more servers in a server system. Search server 208 includes an interface 216 for receiving queries and providing initial analysis of such queries. For example, interface 216 may reformat a query, or re-write a query, such as by including synonyms for terms in the query, by including additional query terms that have been determined to be related to the submitted query (such as by using physical environment data), and may also perform other manipulations of an incoming query.

Search engine 218 may take a variety of common forms and may access an index of a search corpus 223 that has been created by a spider that has searched the web for documents in a familiar manner. Once matching documents have been found using the index, the search engine 218 may refer to rules or signals in a rules/signal repository 222 to rank the search results. Such rules or signals may depend in part on rules associated with model 210 so that search results are ranked according to a likelihood that corresponds to physical environment variables around device 202.

Ad selector 220 may identify ads that are responsive to a query in a manner similar to that for search engine 218. The ad selector 220 may conduct its search on key words provided by advertisers who have submitted ads stored in an ad product corpus 225. The relevance and rank of an ad may, in one example, depend on a combination of a price bid by the advertiser associated with the ad, and a likelihood that users, such as the user of device 202, will select the ad so as to create a billing event for the ad provider.

Using the system 200, a number of search interactions may be analyzed to identify correlations that are associated with physical environment for a searcher. Where sufficiently strong correlation is found between a physical environment variable and interaction by a searcher with search results, the system 200 may change the results or the order of the results for later users identified to have the similar physical environment variables. As a result, the system 200 may provide a benefit to users by displaying search results that are more relevant to them (by being relevant to the physical world around them), and advertisements for which they are more receptive. In a similar manner, advertisers may benefit by having their advertisements displayed to users who are more likely to select them and respond by purchasing their products or services. In a like manner, an operator of system 200 may generate more advertising revenue with such a system 200, where search results are more relevant and thus draw users back to the system 200, and advertisements are more relevant and thus cause users to interact more with the advertisements.

Figure 3A:
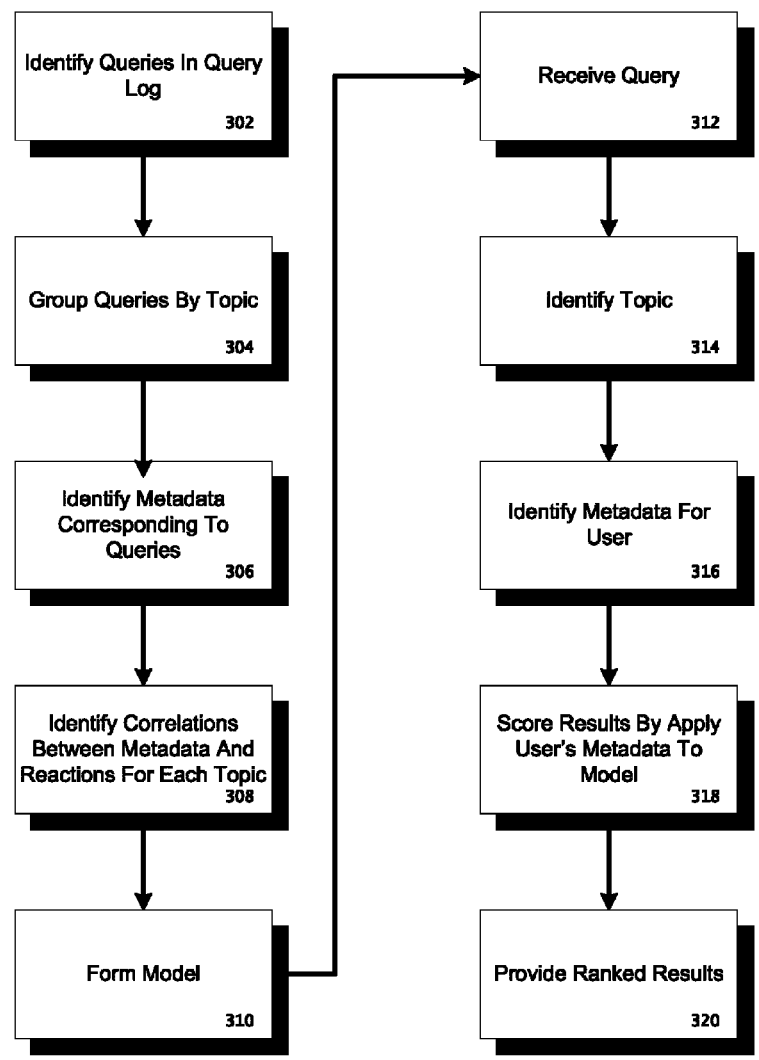
FIG. 3A is a flowchart of a process for using correlations in physical environment variable to affect search results.

FIG. 3A is a flowchart of a process for using correlations in physical environment variable to affect search results. In general, the process involves identifying queries that are similar to each other and then identifying correlations between metadata for the queries that reflect the physical environment in which the queries were made, and particular user reactions to the queries. Such identification may then be used to modify the manner in which search results are provided in the future for similar queries under similar physical environment variables.

The process starts at box 302, where queries in a query log are identified. Such identification might simply involve accessing a log that is stored in a known location. The queries may then be grouped by topic (box 304), such as by identifying similar queries that are synonyms to each other or that otherwise relate to a common topic. Such identification of topics for queries may be conducted by providing a training set of queries and using machine learning to identify queries that are similar to each other. In one example, queries that generate similar results, and for which users click on the same results frequently, can be assumed to be queries having a similar topic, so that the queries may be grouped together.

Metadata corresponding to the queries may then be identified (box 306). As one example, the metadata may include demographic data about a person making the query, such as an age range or gender for the user, where the user has previously chosen to make such information available to the process. Such metadata may also include physical environment data surrounding the user. As discussed above, such physical environment data can include temperature or other weather data, news in an area, economic indicators for an area, and other similar data for the area surrounding a user who submits a query.

At box 308, correlations between metadata and reactions for each topic may be identified, or other similar correlations may be identified. For example, a logistic regression model may be determined from the data when various physical environment variables are held constant, to identify correlation between such variables and other information such as particular URLs or ads that users select when they are subject to a particular physical environment, and when they have entered a particular search query. Various levels of correlation may be determined using one of a number of different statistical approaches, and lack of correlation for other values of a factor related to a physical environment may indicate stronger correlation for a particular factor. For example, high correlation between users in a cold environment, accompanied by low correlation between such users and other users in a warm environment, may indicate that the factor has a large effect over user behavior for a certain query.

At box 310, a model is formed from the analysis of correlation between physical environment data and search outcomes. For example, in one instance, the model may involve a mapping of a provided query to an enlarged or modified query. Alternatively, the model may involve modifying rankings of results that have been found to be responsive to the initial query, but without the necessity to rewrite that query. In yet another implementation, a revision to the query may be made, and changes to the ranking of results may also be made using various data such as physical environment data.

As shown in the second column of the flow chart for the process in FIG. 3A, such a model may then be applied in the future to queries as they arrive, to change either the query or the results produced from a query, or both. At box 312, a query is received by a system. The query may take a standard form, such as a textual phrase submitted to a search engine home page.

At box 314, a topic of the query is identified. For example, the query may be analyzed to determine whether it falls into a query cluster for which prior users submitting the query reacted in manners that were similar to that for users who submitted other queries.

In addition, metadata for the user may be identified (box 316). Such metadata can include static information such as demographic data about a user, or dynamic physical environment data such as a location of a user and a temperature and/or humidity in the area of the user. Such data may be determined, such as by obtaining current weather data for an area, or it may be inferred, such as by looking up a typical temperature in a location of the user on the relevant date and at the relevant time (without identifying the actual temperature). The level of precision needed in such data may change depending on the use to which the data is being put.

At box 318, the metadata may be used to score the search results to be provided to the user (box 320). For example, a correlation factor between the particular physical environment data and actions by prior users may have been determined, and the score for a particular result may be multiplied by the correlation factor (which may be normalized to a value around 1.0 or a range from 0.0 to 1.0). Thus, where there is a greater correlation for a particular result under particular physical environment conditions, the result may be elevated in score. In other words, if prior users reacted positively to a particular result by clicking a lot on that result, then the process may elevate the rank of that result for the later user where the prior users and the later user share a physical environment value that highly correlates to the user actions. Likewise, scores for ads may be elevated or decreased in a similar manner.

The process may then provide the ranked results (box 320). Such provision may occur by a search engine server (which may comprise a single server or many, many servers working together as a group) formatting the results, such as in a dynamically generated mark-up document, and causing the document to be sent through an interface (including, e.g., a web server) over the internet and back to a user client device that submitted the initial query.

Figure 3B:
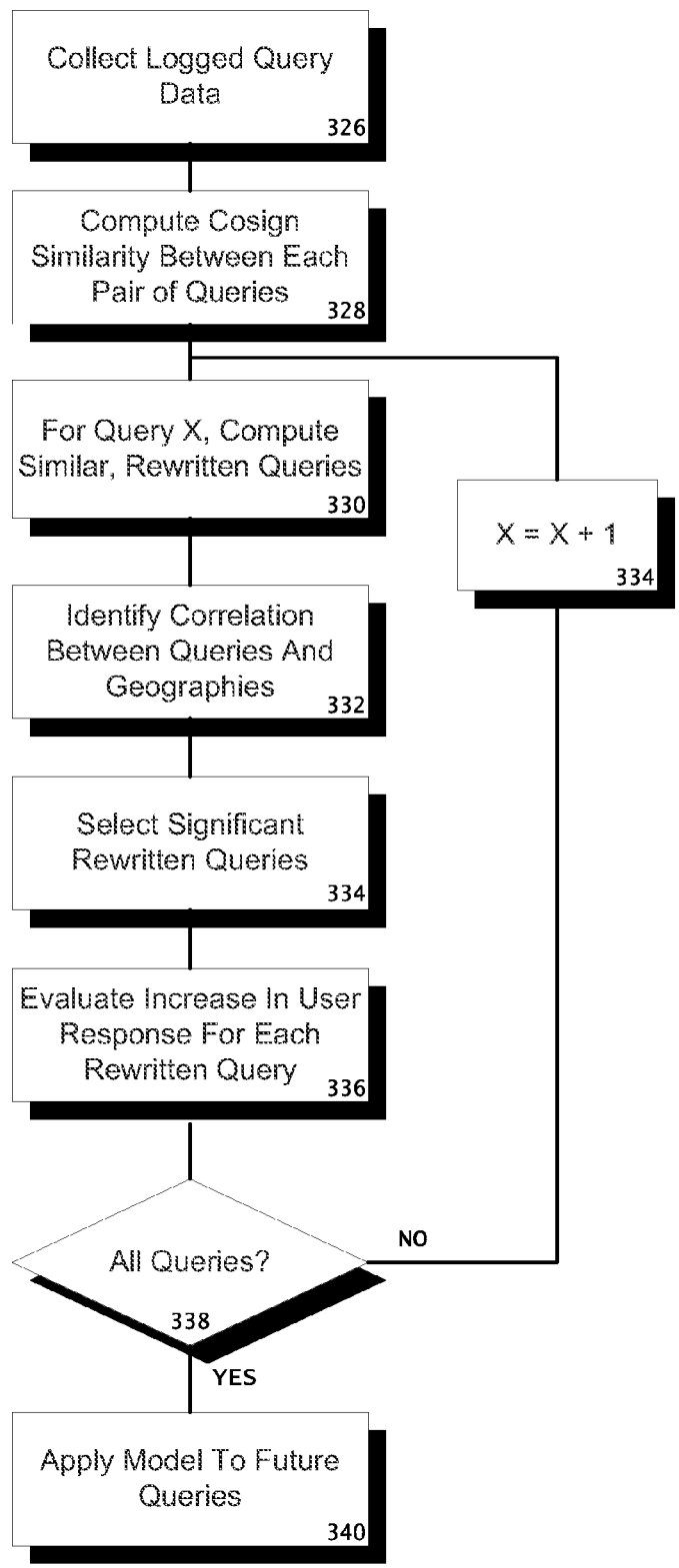
FIG. 3B is a flowchart of a process for rewriting search queries according to physical environment variable.

FIG. 3B is a flowchart of a process for rewriting search queries according to physical environment variables. In general, the process involves identifying similarity between queries based at least in part on how users react to the search results for such queries. Such similarities may then be used to combine the queries into a rewritten query that may result in a broader and more accurate set of search results that are responsive to a user's needs. One factor in determining whether there is a correlation between particular queries is the matching of certain physical environment factors that surround a person submitting a query.

The process begins at box 326, where the process collects query log data. Such data may take a variety of forms and may be data that is saved by a commercial search engine for later analysis in various forms. The data, in appropriate circumstances, may be anonymized, or may be associated with session IDs or other such information, and not be made available for matching with particular users. Such data may include the content of queries submitted by users, the results that each user clicked on, and any advertisements that a user selected.

At box 328, the process computes cosine similarities between each pair of queries in a query log. The similarities may represent an angle between two vectors, where the cosine of the angle between the vectors represents a level of similarity between the vectors, where the vectors are plotted in a space representing query concepts. Such space may involve a certain number of top document search URL's that were clicked by users who issued a particular query.

An iterative sub-process then begins identifying re-written queries for each query in the log, and identifying whether the re-written queries should be used to affect later searches relating to the initial query. At box 330, a first query is selected and the process computes similar, related queries for the selected query. The list of similar queries is computed such that each member's cosine similarity is greater than a user-specified threshold, and the rewritten query has seen a particular threshold of user activity in the past. For example, such activity may include user selections on search results or advertisements for a query. Setting a limit for cosine similarity helps assure that the queries are similar, while setting a limit for frequency of use helps ensure that statistically meaningful activity is being measured rather than potential outliers.

At box 332, the process identifies correlations between the queries and a particular physical environment factor, which in this example is a geography around where the query was submitted. Such geography, as noted above, may be determined from GPS data, from an IP address, from cell IDs, from explicit geography provided by a searcher (e.g., by placing the name of a city in a query), or from other similar sources. Each query expansion may be evaluated based on how different the expansions are for different values of the relevant physical environment factor—in this case, a country or other geographic area. If, for the given query, there exists a pair of areas or countries for which the query rewrites have a low amount of overlap, than those rewrites may be considered to be significant. That is because such values indicate a strong correlation for rewrites within a particular value for a factor (within a particular region), and a weak correlation between different values for that same factor (between different regions). Thus, at box 334, significant re-written queries are selected.

At box 336, the process evaluates increases in user responses for each re-written query. For example, the process may determine the difference between a number of responses, such as in the form of search result clicks or ad clicks, for an original query and for the union of all similar queries. If the expansion will give a certain threshold percentage level of more good clicks, where a user may set a particular threshold, then the rewritten query can be determined to be a preferable rewritten query, particularly where the increase in clicks results in an increase in ad clicks that produce revenue for an organization operating the process.

At box 338, the process tests to check whether all queries have been reviewed and analyzed, and if they have not, the process moves to a next query (box 334) in the sub-process of evaluating re-written queries. The sub-process for each relevant query is repeated until all queries have been analyzed. If the last query has been analyzed, a model is formed from the analyses (box 340), such as a model that causes submitted queries to be rewritten into the queries determined to be significant in causing an increase in clicks, when a particular user's physical environment is similar to that for the users of the queries that were analyzed. Such a model may then be applied to future queries (box 340), such as by substituting the rewritten queries whenever a matching query is received in such a situation.

Figure 3C:
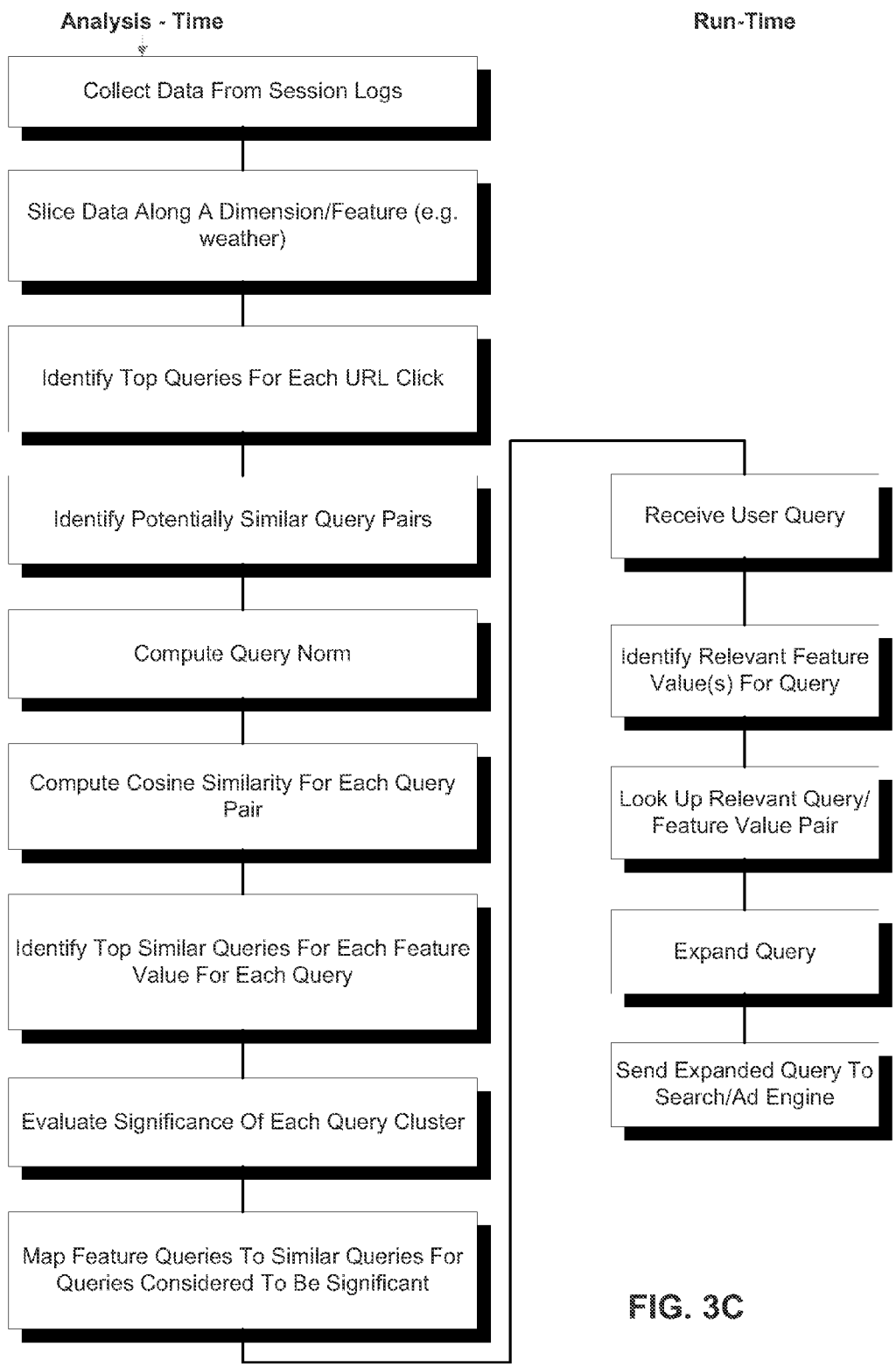
FIG. 3C is a flowchart of a process for using identified correlations in physical environments of users to affect search results.

FIG. 3C is a flowchart of a process for using identified correlations in physical environments of users to affect search results. In general, the process involves analyzing search log data along dimensions relating to factors such as physical environment variables, forming clusters of similar queries for such dimensions, and determining correlations among such queries in the cluster to identify queries that are similar to each other with respect to user interactions that depend on the physical environment data. Such similar queries may then be used in a run-time phase of the process to rewrite submitted queries and to thereby expand queries that are provided to a search engine.

The process begins at box 350, where data from session logs is collected as part of an analysis-time sub-process. The data may be parsed or otherwise organized into a number of fields in a table, such as fields representing search queries submitted for each entry, search results selected by a user and ads selected by a user, time and date indicators, and geographic area indicators, such as region, metro, country, latitude, and longitude indicators. In addition, data may be included such as representations of temperature, humidity, and language in an area around each submission, in addition to other factors such as a ranking that represents a general mood or morale in an area around each search at the time the searches were conducted.

At box 352, the data is sliced along a dimension or feature, such as the temperature and/or humidity at the time of the particular search. The data may then be parsed along that feature to create an output table that includes counts of each combination of feature/query and a user selection, to indicate in a rough manner where correlations may occur between features and selections, features and queries, and queries and selections.

At box 354, the process identifies top queries for each URL that was clicked by a user. Because millions of queries may lead to each URL click, this sorting of the topmost queries may isolate the queries for which there was substantial activity, so as to indicate a stronger chance of positive correlation and also sufficient data to be statistically significant.

At box 356, the process identifies potentially similar query pairs from a list of queries for each selected URL, and the process may enumerate distinct query pairs that might be similar, using a cosine metric. The output of such a step may be a table that maps feature/query pairs to particular counts for each feature/query pair. Such a result reflects the prevalence of query pairs for a particular feature, and thus the correlation between each query in a query pair when judged across that particular feature value.

At box 358, a query norm is computed. Such a computation normalizes a cosine similarity metric and also may be used independently in future computations for the process. The output of such a step may be a table that maps particular combinations of features and queries to a particular normalized value.

At box 360, cosine similarities are computed for each query pair. In particular, the queries may be plotted as vectors in a space of the top search URL's that were clicked for a particular query, and a cosine similarity may represent a similarity factor between the two queries. Thus, for each particular combination of feature and query, a list of similar queries may be output. The output of such a step may be a table that maps a particular combination of feature/query to a list of queries that are similar to the query of interest.

At box 362, the process identifies top similar queries for each feature value for each query. For example, where the feature is outdoor temperature, a value from 1 to 5 may be assigned, where 1 is very cold and 5 is very warm. Queries with very close cosine similarity at each one of the five values may be identified, thus representing in a certain manner a correlation between the queries that relates to the particular feature value.

At box 364, the process evaluates the significance of each query cluster that has been formed. A query cluster is significant if there is a significant amount of percentage increase in new results for an expanded query as compared to an initial query, and the expansion is significantly different across a particular factor. For example, where a physical environment factor includes geographic regions, and the process monitors user reactions to targeted advertisements, a query cluster may be significant if there is a significant level of percentage increase in new advertisements that are being shown for the expanded query as opposed to the original query. The output of such a step may be a table that maps a query to a query cluster for such transformations that resulted in a significant improvement for user reactions.

In a process that monitors improvements in responses to targeted advertisements, there may be at least two ways to evaluate a particular query cluster. First, the cluster may be evaluated by query expansions. For example, if the query expansions for at least a pair of regions or other relevant factor have a low amount of overlap and the expansions are significant for the particular query, the query cluster may be marked as being significant for that feature. The amount of overlap may be computed as an intersection between two values divided by a union between the two values, normalized by multiplying by 100.

Second, a query cluster may be evaluated by the level of improvement in advertisements that it generates. In particular, for each query expansion, the process may compute ads that will be targeted for that expansion. If the improvement in the number of ads shown by expanding the query improves over the ads shown by an original query, the expansion can be considered to be good. Also, if there is a least a pair of geographic regions, where a geographic region is the physical environment factor under consideration, in which the overlap percentage of the ads that are shown is low, the query cluster may be considered significant for that feature.

Finally, at box 366, feature queries are mapped to similar queries for the queries that are considered to be significant. In particular, a combination of a feature value and a query value may result in a list of similar queries when the initial query value is entered by a user whose physical environment matches the value of the particular feature. For example, the value of the feature may be a particular region in which the user is located, or a temperature in the outdoor area around the user.

The remaining boxes of FIG. 3C indicate actions that may occur at run-time, such as after a group of query expansions have been computed, and additional users are now entering queries and looking for results. In particular, the results provided now by the process may differ from the results previously provided by the process, because the new results may incorporate the physical environment data analyzed in the steps just discussed. The runtime process begins at box 368, where the process receives a user query. In addition, the process may, at box 370, identify relevant feature values for the query. For example, the process may determine a temperature for an area around the user who submitted the query, or a region from which the query was submitted.

At box 372, a relevant query feature/value pair is looked up, from the mapped feature/query pairs in box 366, and at box 374, the query is expanded, using the table created at box 366. For example, the expansion may involve a simple lookup of a multidimensional table for a particular query/feature pair, followed by application of an expanded query that matches that pair.

At box 376, the process ends by sending the expanded query to a search and/or ad engine. The expanded query may result in the retrieval of search results that will differ somewhat from the results that were previously provided when the queries analyzed in the analysis time part of the process were submitted. Preferably, the results more accurately reflect the actual needs of the users by taking into account their physical environment.

Figure 4:
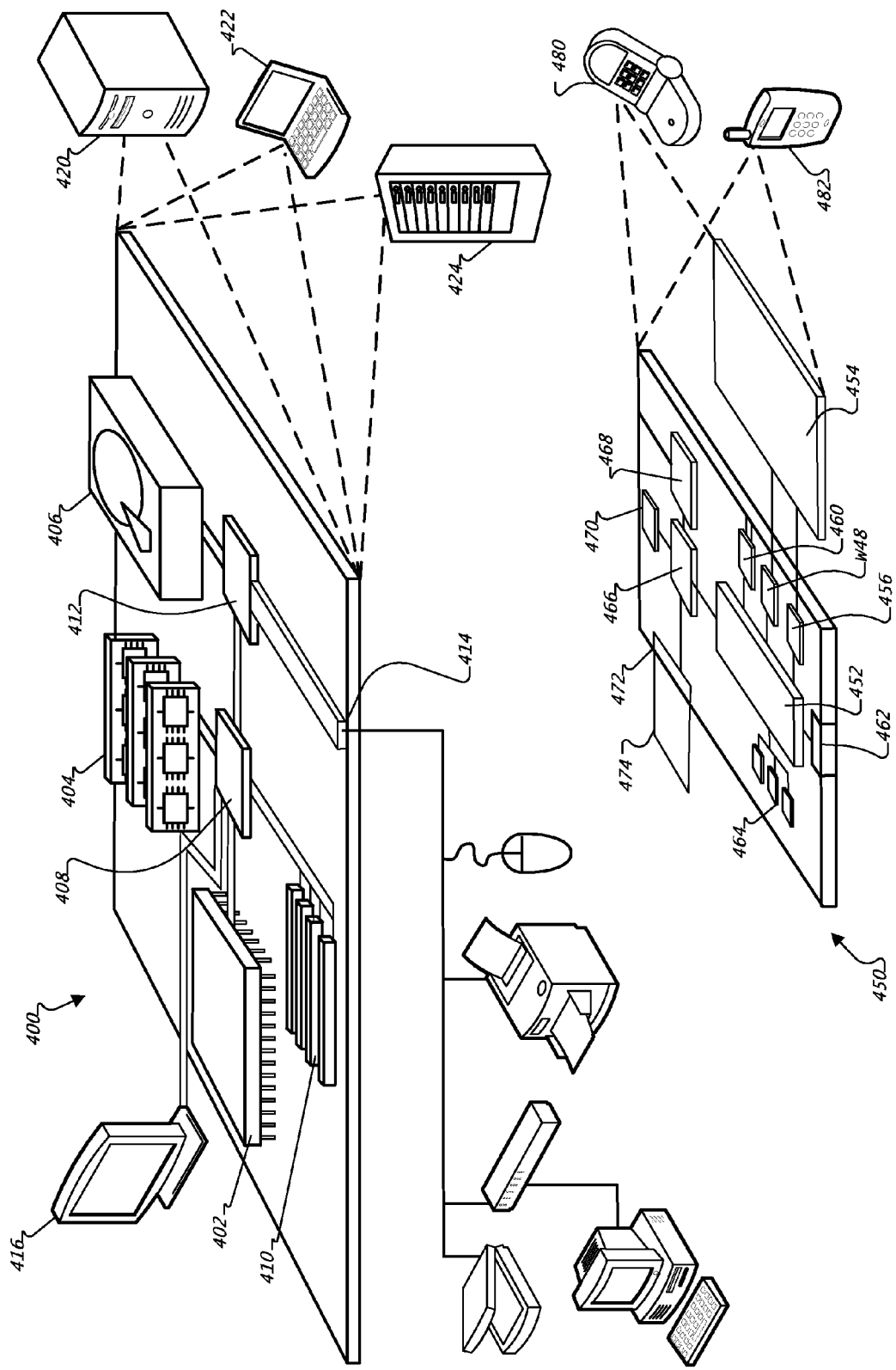
FIG. 4 shows an example of a computer device and a mobile computer device that can be used to implement the techniques described here.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, certain particular variable for a user's physical environment have been highlighted as examples here, but other such variables may also be employed.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    receiving a search query from a computing device, where the received search query has at least two different meanings;
    identifying first metadata associated with the received search query, wherein the first metadata is selected from the group consisting of a geographic location associated with the computing device, a date of the received search query, a time of day of the received search query, an age of a searching user submitting the received search query, a gender of the searching user submitting the received search query, and a language associated with the received search query;
    using the first metadata to promote search results corresponding to a first meaning of the at least two meanings of the received search query, wherein using the first metadata to promote search results corresponding to the first meaning of the at least two meanings of the received search query comprises:
        analyzing (a) prior search queries that are related to the received search query, (b) second metadata associated with the prior search queries, and (c) selections of prior search results provided in response to the prior search queries, wherein the selections of the prior search results are based on clicks on each prior search result among the prior search results and how long a clicking user stayed at each prior search result upon which the clicking user clicked;
        identifying a correlation between the second metadata associated with the prior search queries and the selections of the prior search results presented in response to the prior search queries;
        identifying a plurality of candidate search results that are responsive to the received search query;
        calculating a score for each of the candidate search results, wherein the score is based at least in part on the correlation, the first metadata, and the plurality of candidate search results; and
        promoting search results corresponding to the first meaning of the at least two meanings among the plurality of candidate search results based on the first metadata associated with the received search query and the correlation by ranking the search results based on the scores; and
    providing the promoted search results corresponding to the first meaning of the received search query to the computing device.

2. The computer-implemented method of claim 1, wherein using the first metadata to promote search results corresponding to the first meaning of the at least two meanings of the received search query further comprises:
    increasing the rank of one or more ranked candidate search results responsive to the received search query having a positive correlation with the identified first metadata.

3. The computer-implemented method of claim 1, wherein using the first metadata to promote search results corresponding to the first meaning of the at least two meanings of the received search query comprises:

demoting the rank of one or more ranked candidate search results responsive to the received search query having a negative correlation with the identified first meta data.

4. The computer-implemented method of claim 1, wherein identifying first metadata associated with the received search query comprises:
   identifying a network address associated with the computing device; and
   determining a geographic location associated with the identified network address.

5. One or more tangible computer-readable storage media storing instructions that, when executed by a processor, perform operations comprising:
   receiving a search query from a computing device, where the received search query has at least two different meanings;
   identifying first metadata associated with the received search query, wherein the first metadata is selected from the group consisting of a geographic location associated with the computing device, a date of the received search query, a time of day of the received search query, an age of a searching user submitting the received search query, a gender of the searching user submitting the received search query, and a language associated with the received search query;
   using the first metadata to promote search results corresponding to a first meaning of the at least two meanings of the received search query, wherein using the first metadata to promote search results corresponding to the first meaning of the at least two meanings of the received search query comprises:
      analyzing (a) prior search queries that are related to the received search query, (b) second metadata associated with the prior search queries, and (c) selections of prior search results provided in response to the prior search queries, wherein the selections of the prior search results are based on clicks on each prior search result among the prior search results and how long a clicking user stayed at each prior search result upon which the clicking user clicked;
      identifying a correlation between the second metadata associated with the prior search queries and the selections of the prior search results presented in response to the prior search queries;
      identifying a plurality of candidate search results that are responsive to the received search query;
      calculating a score for each of the candidate search results, wherein the score is based at least in part on the correlation, the first metadata, and the plurality of candidate search results; and
      promoting search results corresponding to the first meaning of the at least two meanings among the plurality of candidate search results based on the first metadata associated with the received search query and the correlation by ranking the search results based on the scores; and
   providing the promoted search results corresponding to the first meaning of the received search query to the computing device.

6. The tangible computer-readable storage media of claim 5, wherein using the first metadata to promote search results corresponding to the first meaning of the at least two meanings of the received search query further comprises:
   increasing the rank of one or more ranked candidate search results responsive to the received search query having a positive correlation with the identified first metadata.

7. The tangible computer-readable storage media of claim 5, wherein using the first metadata to promote search results corresponding to the first meaning of the at least two meanings of the received search query comprises:
   demoting the rank of one or more ranked candidate search results responsive to the received search query having a negative correlation with the identified first meta data.

8. The tangible computer-readable storage media of claim 5, wherein identifying first metadata associated with the received search query comprises:
   identifying a network address associated with the computing device; and
   determining a geographic location associated with the identified network address.

9. A system comprising:
   one or more computer processors; and
   one or more non-transitory computer readable devices that include instructions that, when executed by the one or more computer processors, causes the processors to perform operations, the operations comprising:
   receiving a search query from a computing device, where the received search query has at least two different meanings;
   identifying first metadata associated with the received search query, wherein the first metadata is selected from the group consisting of a geographic location associated with the computing device, a date of the received search query, a time of day of the received search query, an age of a searching user submitting the received search query, a gender of the searching user submitting the received search query, and a language associated with the received search query;
   using the first metadata to promote search results corresponding to a first meaning of the at least two meanings of the received search query, wherein using the first metadata to promote search results corresponding to the first meaning of the at least two meanings of the received search query comprises:
      analyzing (a) prior search queries that are related to the received search query, (b) second metadata associated with the prior search queries, and (c) selections of prior search results provided in response to the prior search queries, wherein the selections of the prior search results are based on clicks on each prior search result among the prior search results and how long a clicking user stayed at each prior search result upon which the clicking user clicked;
      identifying a correlation between the second metadata associated with the prior search queries and the selections of the prior search results presented in response to the prior search queries
      identifying a plurality of candidate search results that are responsive to the received search query;
      calculating a score for each of the candidate search results, wherein the score is based at least in part on the correlation, the first metadata, and the plurality of candidate search results; and
      promoting search results corresponding to the first meaning of the at least two meanings among the plurality of candidate search results based on the first metadata associated with the received search query and the correlation by ranking the search results based on the scores; and
   providing the promoted search results corresponding to the first meaning of the received search query to the computing device.

10. The system of claim 9, wherein using the first metadata to promote search results corresponding to the first meaning of the at least two meanings of the received search query further comprises:
   increasing the rank of one or more ranked candidate search results responsive to the received search query having a positive correlation with the identified first metadata.

11. The system of claim 9, wherein using the first metadata to promote search results corresponding to the first meaning of the at least two meanings of the received search query comprises:
   demoting the rank of one or more ranked candidate search results responsive to the received search query having a negative correlation with the identified first meta data.

12. The system of claim 9, wherein identifying first metadata associated with the received search query comprises:
   identifying a network address associated with the computing device; and
   determining a geographic location associated with the identified network address.

* * * * *